(12) United States Patent
Jang et al.

(10) Patent No.: US 12,271,725 B2
(45) Date of Patent: Apr. 8, 2025

(54) UPGRADABLE ELECTRONIC DEVICE AND METHOD FOR UPGRADING ELECTRONIC DEVICE

(71) Applicant: LG ELECTRONICS INC., Seoul (KR)

(72) Inventors: Youngjo Jang, Seoul (KR); Young Kwan Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 18/093,073

(22) Filed: Jan. 4, 2023

(65) Prior Publication Data

US 2023/0214206 A1 Jul. 6, 2023

(30) Foreign Application Priority Data

Jan. 4, 2022 (KR) ........................ 10-2022-0001080

(51) Int. Cl.
*G06F 8/65* (2018.01)
*G06F 9/445* (2018.01)
*H04L 29/08* (2006.01)
*H04L 67/00* (2022.01)
*G06F 3/06* (2006.01)

(52) U.S. Cl.
CPC ................ *G06F 8/65* (2013.01); *H04L 67/34* (2013.01); *G06F 3/061* (2013.01)

(58) Field of Classification Search
CPC ............. G06F 8/65; G06F 3/061; H04L 67/34
See application file for complete search history.

(56) References Cited

U.S. PATENT DOCUMENTS

| 2007/0286227 A1* | 12/2007 | Koezuka ................. H04L 12/66 370/445 |
| 2016/0337223 A1* | 11/2016 | Mackay ............... H04L 43/0894 |
| 2017/0063508 A1 | 3/2017 | Stalley |

(Continued)

FOREIGN PATENT DOCUMENTS

| EP | 3855306 | 7/2021 |
| JP | 2009-155377 A | 7/2009 |

(Continued)

OTHER PUBLICATIONS

Amit Mondal, Transport and Application Layer Approaches to Improve End-to-end Performance in the Internet, Jun. 2010, [ Retrieved on Nov. 20, 2024]. Retrieved from the internet: <URL: https://users.cs.northwestern.edu/~akm175/docs/dissertation.pdf> 157 Pages (1-157) (Year: 2010).*

(Continued)

*Primary Examiner* — Anibal Rivera
(74) *Attorney, Agent, or Firm* — KED & Associates LLP

(57) ABSTRACT

An upgradable electronic device includes: a first communication unit receiving data for upgrade from outside the electronic device; and a main controller receiving the data from the first communication unit to retransmit the data or to perform a predetermined function using the data, wherein the first communication unit divides the data into multiple data segments and transmits n (n being a natural number greater than or equal to 2) data segments to the main controller before the first communication unit receives a receipt acknowledgment signal from the main controller.

19 Claims, 10 Drawing Sheets

(56) References Cited

U.S. PATENT DOCUMENTS

| | | | |
|---|---|---|---|
| 2018/0018159 A1 | 1/2018 | Eller | |
| 2018/0020392 A1 | 1/2018 | Eller | |
| 2018/0167277 A1* | 6/2018 | Mahimkar | H04L 41/082 |
| 2018/0232222 A1* | 8/2018 | Conforti | G06F 16/119 |
| 2020/0092396 A1* | 3/2020 | Wu | H04W 72/121 |
| 2021/0263724 A1 | 8/2021 | Ye | |

FOREIGN PATENT DOCUMENTS

| | | | |
|---|---|---|---|
| KR | 10-2009-0043988 A | 5/2009 | |
| KR | 20090063575 | 6/2009 | |
| KR | 20110020555 | 3/2011 | |
| KR | 101576050 | 12/2015 | |
| KR | 101960736 | 3/2019 | |
| KR | 10-2019-0067764 A | 6/2019 | |
| KR | 102056170 | 12/2019 | |
| WO | WO-2019208870 A1 * | 10/2019 | G06F 8/654 |

OTHER PUBLICATIONS

Extended European Search Report dated Jul. 17, 2023 issued in Application No. 23150164.4.
International Search Report dated Apr. 20, 2023 issued in Application No. PCT/KR2023/000046.
Korean Office Action dated Oct. 10, 2024 issued in Application 10-2022-0001080.

* cited by examiner

UPGRADABLE ELECTRONIC DEVICE AND METHOD FOR UPGRADING ELECTRONIC DEVICE

CROSS-REFERENCE TO RELATED APPLICATION

This application claims priority to and the benefit of Korean Patent Application No. 10-2022-0001080, filed in Korea on Jan. 4, 2022, the disclosure of which is incorporated herein by reference in its entirety.

BACKGROUND

1. Field

Embodiments of the present disclosure relate to an upgradable electronic device and a method for upgrading the electronic device.

2. Background

An electronic device includes a controller that controls operations of the electronic device. The controller controls the electronic device through execution of a specific program to implement functions desired by users.

After-sales service for electronic devices is limited to simple support, such as software debugging. Accordingly, a user who wants a new function needs to purchase a new electronic device. That is, an electronic device purchased by a user undergoes a significant decrease in residual value over time, which leads to user complaints.

Accordingly, many studies are being conducted on a method of improving existing functions of an electronic device or adding a new function to the electronic device through modification of the program, and some of such studies are being put into practice.

In order to modify the program, data including a program needs to be transmitted. However, it may take a lot of time to transmit such data, which becomes an obstacle in modifying the program.

BRIEF DESCRIPTION OF THE DRAWINGS

Arrangements and embodiments may be described in detail with reference to the following drawings in which like reference numerals refer to like elements and wherein:

FIG. 9 and FIG. 10 are flow diagrams of a process of transmitting program data in a method of upgrading electronic devices according to respective embodiments of the present disclosure.

DETAILED DESCRIPTION

Figure 1:
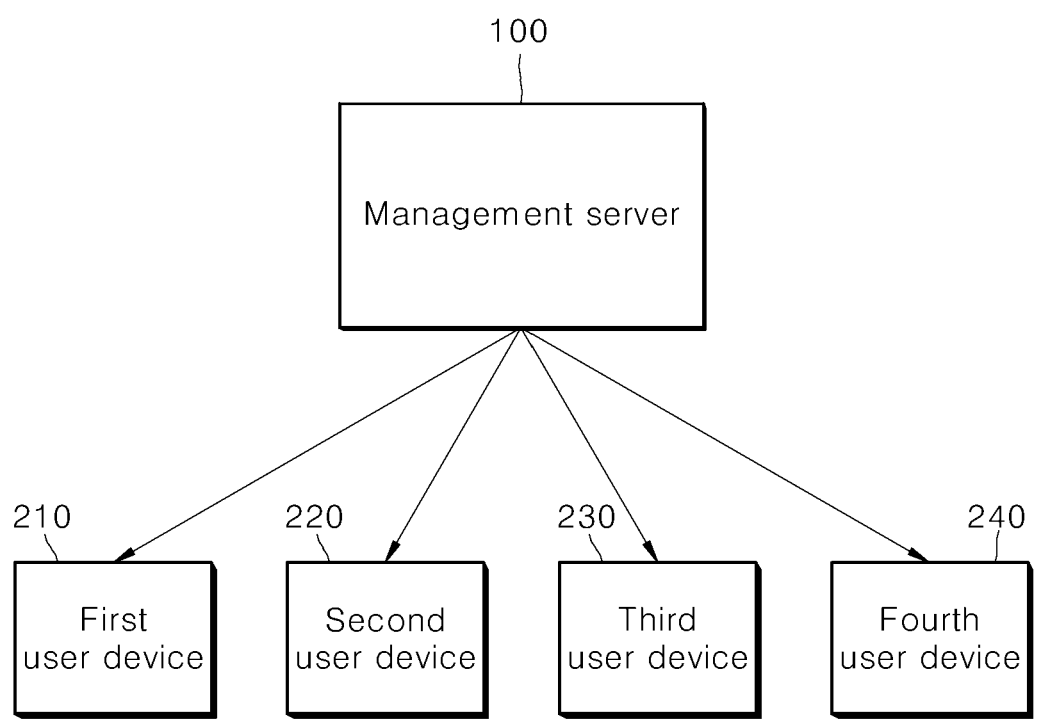
FIG. 1 is a schematic block diagram of a system for upgrading electronic devices according to one embodiment of the present disclosure.

The above and other objects, features, and advantages of the present disclosure may become apparent from the detailed description of the following embodiments in conjunction with the accompanying drawings. Description of known functions and constructions which may unnecessarily obscure the subject matter of the present disclosure may be omitted. Like components may be denoted by like reference numerals throughout the specification.

It will be understood that, although the terms "first", "second", and the like may be used herein to describe various elements and the like, these elements should not be limited by these terms. These terms are only used to distinguish one element from another element. Thus, unless stated otherwise, a first element discussed below could be termed a second element, or vice versa, without departing from the scope of the present disclosure.

In addition, when a component is referred to as being "connected to", "coupled to" or "joined to" another component, these components may be connected, coupled, or joined to each other directly or through another component, or intervening component(s) may be "interposed" therebetween.

Throughout the specification, unless stated otherwise, each element may be singular or plural in number.

As used herein, the singular forms "a", "an", and "the" are intended to include the plural forms as well, unless the context clearly indicates otherwise. Moreover, the terms "comprises", "comprising", "includes" and/or "including" when used in this specification, should not be construed to mean that a process, method, article, or apparatus comprising a list of elements or steps necessarily comprises all the elements or all the steps. Thus, such a process, method, article, or apparatus may be free from some of the elements or the steps, or may further include one or more other elements or steps.

Throughout the specification, the expression "A and/or B" means A, B, or A and B, unless stated otherwise, and the expression "C to D" means "greater than or equal to C and less than or equal to D", unless stated otherwise.

An upgradeable electronic device and a method for upgrading the electronic device according to embodiments of the present disclosure may be described.

FIG. 1 is a schematic block diagram of a system for upgrading electronic devices according to one embodiment of the present disclosure. The system according to this embodiment may include a management server 100 and a plurality of user devices 210, 220, 230, 240.

The management server 100 may store information about electronic devices to be upgraded and information about electronic devices owned by each user.

The information about electronic devices to be upgraded may include program data for a most recent version of each electronic device to be upgraded. In some embodiments, the information about electronic devices to be upgraded may further include at least one of an identifier of each electronic device to be upgraded, program data for each previous version of the electronic device, and delta data derived from comparison between the program data for each previous version of the electronic device and the program data for the most recent version of the electronic device. Program data is data related to operation of the electronic device, and refers to data that can improve functions of the electronic device or add new functions to the electronic device. For example, when the electronic device is an air conditioner, program data may be data for improving a program for adjusting at least one of air volume, airflow direction, and indoor temperature, may be data for improving images displayed on a display module or for displaying a new image, or may be data related to voice information provided by a voice information module.

The information about electronic devices owned by each user may include a user identifier and an identifier of an electronic device associated with the user identifier.

The management server 100 may transmit data for upgrade of each of the user devices 210, 220, 230, 240. The data may include program data for a most recent version of a corresponding electronic device and/or delta data as described above. In some embodiments, the data transmitted by the management server 100 may further include a set of instructions that need to be executed by each of the user devices 210, 220, 230, 240.

Each of the plurality of user devices 210, 220, 230, 240 may include at least one electronic device. The electronic device may include a variety of electronic devices, including a variety of home appliances, such as an air conditioner, an air purifier, a refrigerator, a washing machine, a steam closet, and a water purifier, mobile devices, such as a smartphone, and a variety of automotive electronic devices (for example, a device for autonomous driving, a device for controlling vehicle operation, and the like).

Each of the plurality of user devices 210, 220, 230, 240 may include at least one user terminal. The at least one electronic device may update program data in response to a file received from the management server 100 (i.e., a file including the delta data and/or the set of instructions).

In the following description, a home appliance may be used as an example of an electronic device to be upgraded. However, the present disclosure is not limited thereto.

Figure 2:
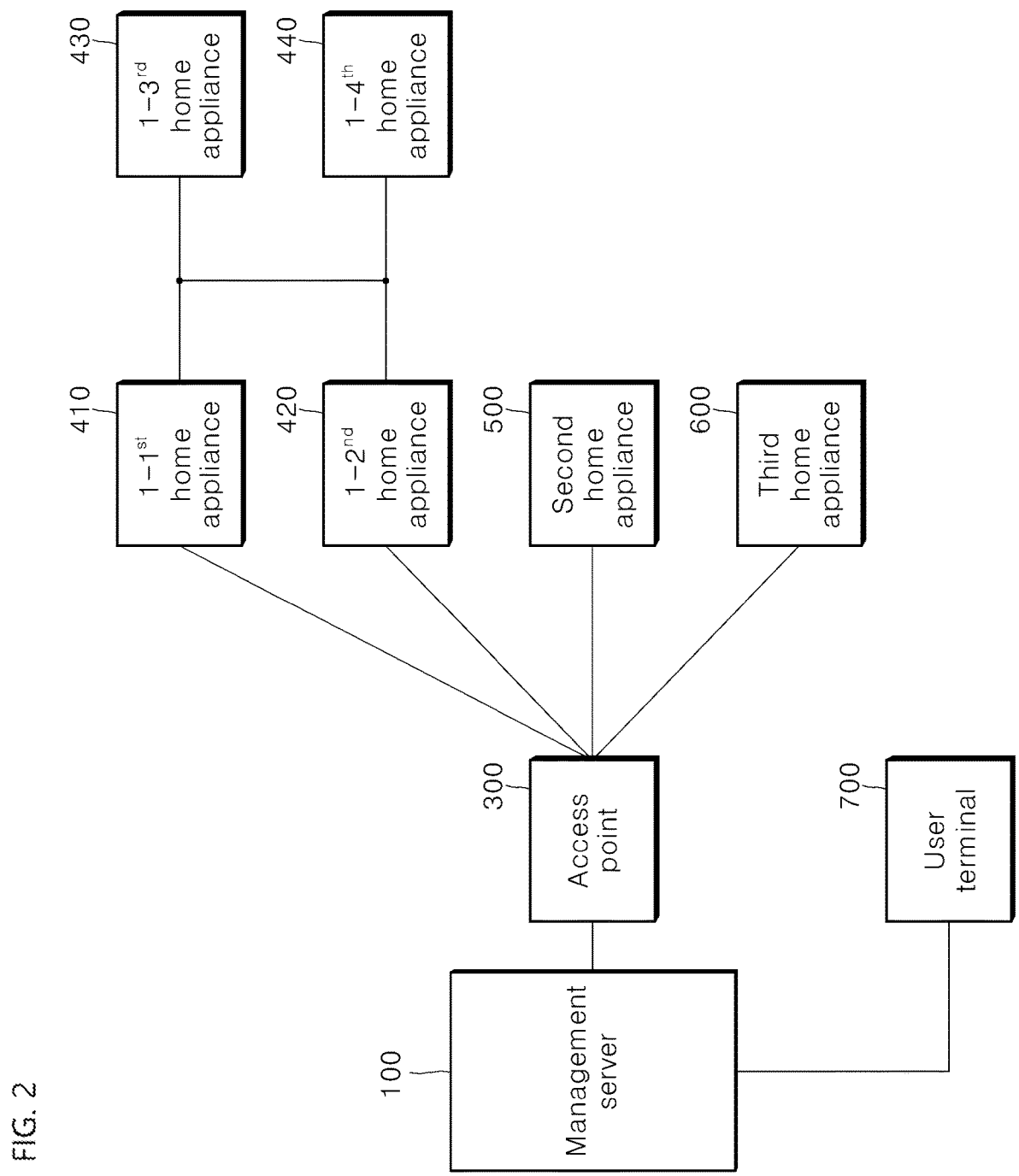
FIG. 2 is a schematic block diagram of a system for upgrading electronic devices according to one embodiment of the present disclosure, illustrating the user device of FIG. 1 in more detail.

FIG. 2 is a schematic block diagram of a system for upgrading electronic devices according to one embodiment of the present disclosure, illustrating the user device of FIG. 1 in more detail. The system according to this embodiment may include the management server 100, an access point 300, a plurality of home appliances 410, 420, 430, 440, 500, 600, and a user terminal 700. That is, each of the plurality of user devices 210, 220, 230, 240 of FIG. 1 may include at least one of the access point 300, the plurality of home appliances 410, 420, 430, 440, 500, 600, and the user terminal 700.

The management server 100 may have the same functions as described with respect to FIG. 1.

The access point 300 may serve to relay communication between the management server 100 and the home appliances 410, 420, 500, 600. The access point 300 may be a Wi-Fi router, for example.

Each of the multiple home appliances 410, 420, 430, 440, 500, 600 may perform a unique function based on execution of a corresponding program.

The home appliances 410, 420, 430, 440 may be individual units of a split-type home appliance, wherein the individual units each have a predetermined function and are connected to one another. For example, a $1\text{-}1^{st}$ home appliance 410, a $1\text{-}2^{nd}$ home appliance 420, and a $1\text{-}3^{rd}$ home appliance 430 may be indoor units of an air conditioner, and a $1\text{-}4^{th}$ home appliance 440 may be an outdoor unit of the air conditioner. The $1\text{-}1^{st}$ home appliance 410 and the $1\text{-}2^{nd}$ home appliance 420 may include a communication module (for example, a Wi-Fi module) for connection to the access point 300. In addition, the $1\text{-}1^{st}$ home appliance 410, the $1\text{-}2^{nd}$ home appliance 420, the $1\text{-}3^{rd}$ home appliance 430, and the $1\text{-}4^{th}$ home appliance 440 may include a communication module for intercommunication. Each of the $1\text{-}1^{st}$ home appliance 410, the $1\text{-}2^{nd}$ home appliance 420, and the $1\text{-}3^{rd}$ home appliance 430 may control at least one of indoor air temperature, humidity, and fine dust concentration through execution of a corresponding program. The $1\text{-}4^{th}$ home appliance 440 may control operation of at least one of a compressor and a fan through execution of a corresponding program.

Each of the second home appliance 500 and the third home appliance 600 may be an independent home appliance. For example, each of the second home appliance 500 and the third home appliance 600 may be one of various home appliances such as a washing machine, an air purifier, a steam closet, and a refrigerator. Each of the second home appliance 500 and the third home appliance 600 may include a communication module (for example, a Wi-Fi module).

The user terminal 700 may be a mobile terminal of a user who owns the multiple home appliances 410, 420, 430, 440, 500, 600.

In some embodiments, the access point 300 may be omitted. In this example, each of the home appliances 410, 420, 500, 600 may access the management server 100 via the Internet or the like. In this example, each of the home appliances 410, 420, 500, 600 may access the management server 100 via wired and/or electronic connection.

Figure 3:
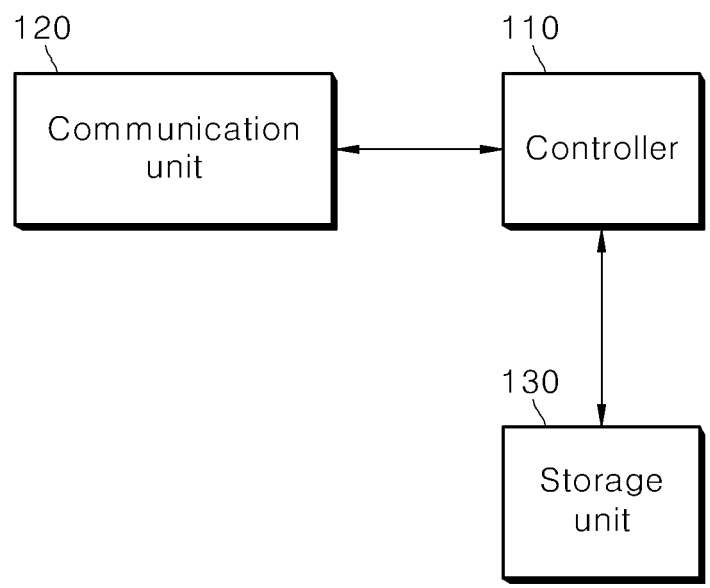
FIG. 3 is a schematic block diagram of a management server for upgrading electronic devices according to one embodiment of the present disclosure.

FIG. 3 is a schematic block diagram of a management server for upgrading electronic devices according to one embodiment of the present disclosure. The management server 100 may include a controller 110, a communication unit 120 (or a communication device, and a storage unit 130 (or a storage, a storage device and/or a memory). The above described components of the management server 100 may be structural components that include hardware.

The controller 110 may transmit program data stored in the storage unit 130. The program data transmitted by the controller 110 may be program data for a most recent version of a corresponding home appliance. In some embodiments, the controller 110 may generate home appliance-specific delta data based on data stored in the storage unit 130 and may transmit the delta data to the home appliances 410, 420, 500, 600 (see FIG. 2) through the communication unit 120. In addition to the program data and/or the delta data, the controller 110 may transmit a set of instructions to be executed by a controller of each of the home appliances 410, 420, 500, 600 (see FIG. 2) through the communication unit 120. In addition to the program data and/or the delta data, the controller 110 may transmit a set of instructions to be executed by a controller of each of the home appliances 410, 420, 500, 600 (FIG. 2).

The controller 110 may include at least one processing unit and/or a memory. The processing unit may include, for example, a central processing unit (CPU), a graphics processing unit (GPU), a microprocessor, an application-specific integrated circuit (ASIC), and a field-programmable gate array (FPGA) and may have multiple cores. The memory may be a volatile memory (for example, RAM and the like), a nonvolatile memory (for example, ROM, flash memory, and the like), and/or a combination thereof.

The communication unit 120 may transmit signals outside the management server under control of the controller 110. The communication unit 120 may receive signals from outside the management server and may transmit the received signals to the controller 110. The communication unit 120 may transmit/receive signals via wired and/or electronic connection. The communication unit 120 may include a modem, a network interface card (NIC), an integrated network interface, a radio frequency transmitter/receiver, an infrared port, a USB port, and/or any other interface for communication with other computing devices.

Under the control of the controller 110, the storage unit 130 may store data received through the communication unit 120 and/or data processed by the controller 110. For example, the storage unit 130 may store at least one of a user identifier, an identifier of a home appliance associated with the user identifier, program data for each version of the home appliance, and delta data derived from comparison between program data for each previous version of the home appliance and program data for a most recent version of the home appliance.

Figure 4:
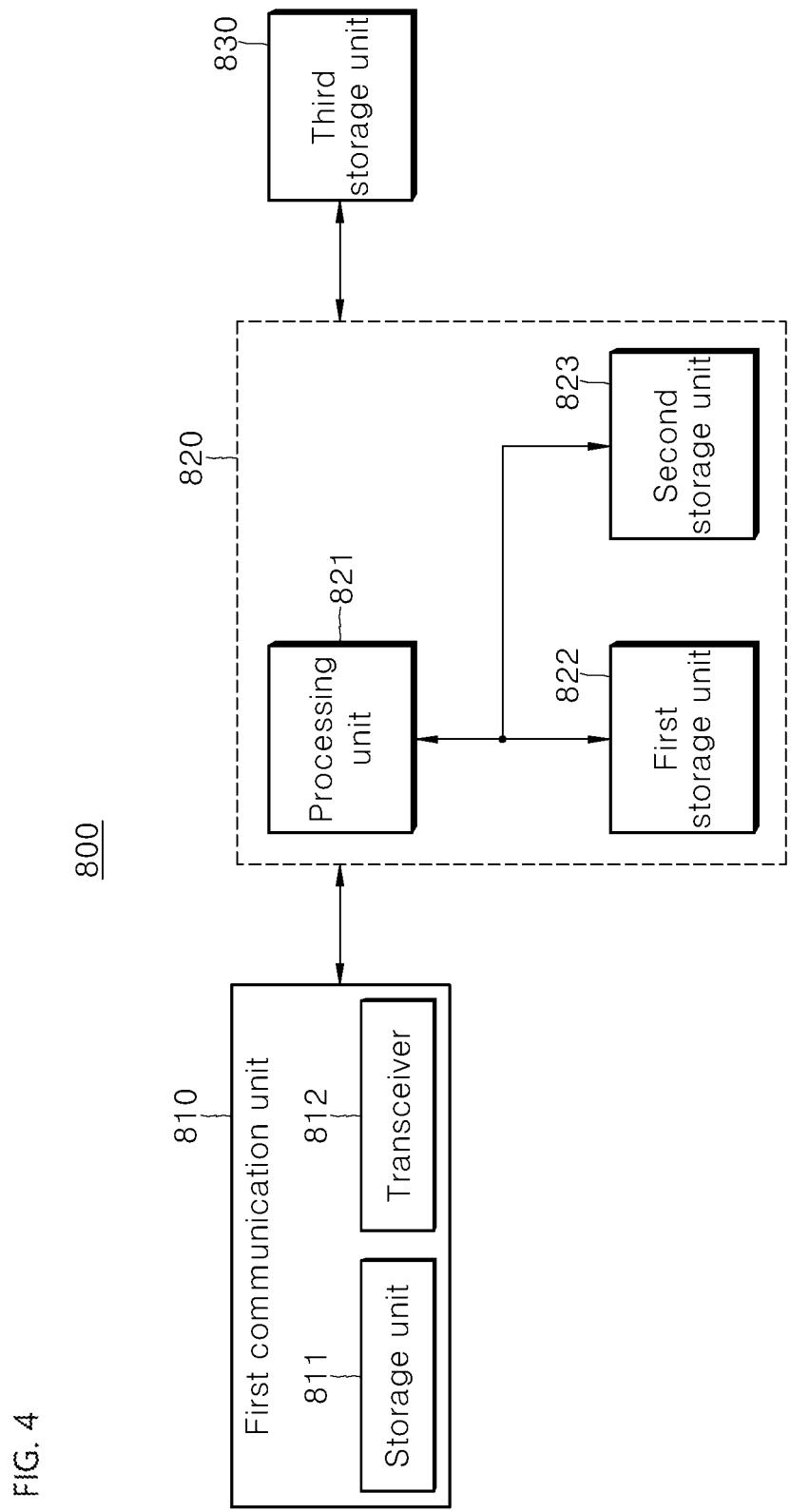
FIG. 4 is a schematic block diagram of an upgradable electronic device according to one embodiment of the present disclosure.

FIG. 4 is a schematic block diagram of an upgradable electronic device according to one embodiment of the present disclosure. The electronic device according to this embodiment may include a first communication unit 810 (or a first communication device), a controller 820, and a third storage unit 830. The first communication unit 810 may include a storage unit 811 and a transceiver 812 and the controller 820 may include a processing unit 821, a first storage unit 822, and a second storage unit 823. Each of the home appliances 410, 420, 500, 600 (FIG. 2) may include the components shown in FIG. 4. In some embodiments, some of the first storage unit 822, the second storage unit 823, and the third storage unit 830 may be omitted from the electronic device according to this embodiment.

The first communication unit 810 may receive data from the management server 100 (see FIG. 1 or FIG. 2) and may transmit the received data to the controller 820. The data received from the management server 100 (see FIG. 1 or FIG. 2) may include at least one of program data, delta data as described above, and an instruction to be executed by the controller 820. The first communication unit 810 may include a radio frequency transmitter/receiver, an infrared port, a USB port, or any other interface. For example, the first communication unit 810 may include a near-field communication module that transmits/receives signals according to a communication protocol such as Wi-Fi or Bluetooth.

The storage unit 811 may store data received from the management server 100 (see FIG. 1 or FIG. 2). The storage unit 811 may be a nonvolatile memory. For example, the storage unit 811 may be a flash memory.

The transceiver 812 may transmit data stored in the storage unit 811 to the controller 820.

The controller 820 may store a program for implementing functions of a corresponding home appliance and may execute the stored program to cause the home appliance to perform a specific function. In addition, the controller 820 may update the stored program in response to data received from the first communication unit 810.

The processing unit 821 may include a central processing unit (CPU), a graphics processing unit (GPU), a microprocessor, an application-specific integrated circuit (ASIC), a field-programmable gate array (FPGA), and/or the like and may have multiple cores.

The first storage unit 822 may be a nonvolatile memory. For example, the first storage unit 822 may be a flash memory. The first storage unit 822 may store the program described above.

The second storage unit 823 may be a volatile memory. For example, the second storage unit 823 may be a RAM. A portion of program data stored in the first storage unit 822 may be loaded into the second storage unit 823, and the program data stored in the second storage unit 823 may be written to a specific area of the first storage unit 822.

The third storage unit 830 may be a nonvolatile memory. The third storage unit may be one selected from among a flash memory, a magnetic storage, and an optical storage. The program for implementing functions of the home appliance may also be stored in the third storage unit 830.

Figure 5:
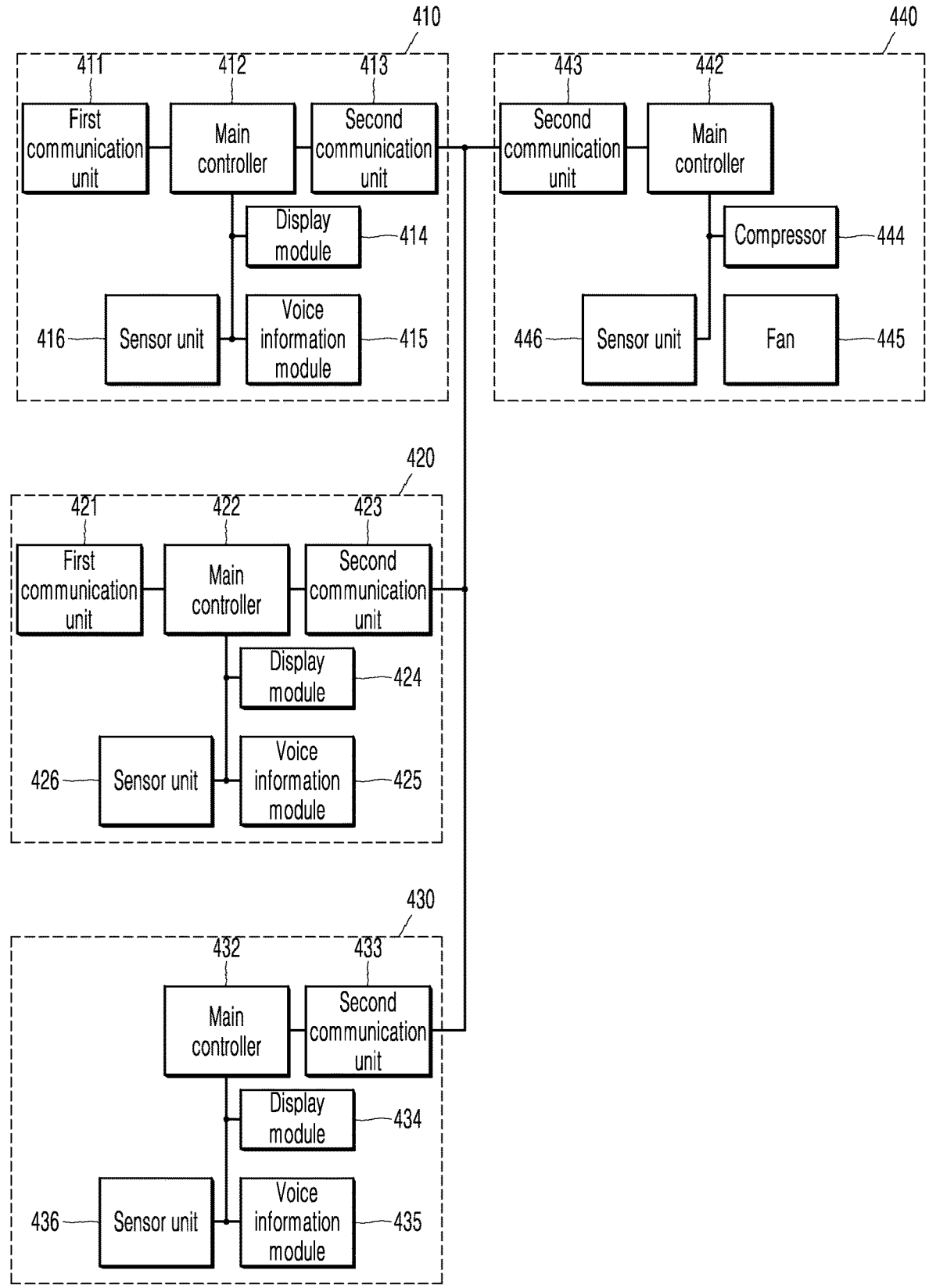
FIG. 5 is a schematic block diagram of an upgradeable split-type home appliance including multiple individual units according to one embodiment of the present disclosure.

FIG. 5 is a schematic block diagram of an upgradeable split-type home appliance including multiple individual units according to one embodiment of the present disclosure. As described above, the $1\text{-}1^{st}$ home appliance 410, the $1\text{-}2^{nd}$ home appliance 420, and the $1\text{-}3^{rd}$ home appliance 430 may be indoor units of an air conditioner, and the $1\text{-}4^{th}$ home appliance 440 may be an outdoor unit of the air conditioner. As described with respect to FIG. 2, the $1\text{-}1^{st}$ home appliance 410 and the $1\text{-}2^{nd}$ home appliance 420 may access the management server 100 via the access point 300 and/or the Internet.

The $1\text{-}1^{st}$ home appliance 410 may include a first communication unit 411, a main controller 412, and a second communication unit 413. In some embodiments, the $1\text{-}1^{st}$ home appliance 410 may further include at least one of a display module 414 (or a display device or a display), a voice information module 415, and a sensor unit 416 (or a sensor device or a sensor). Each of the communication units may be referred to as a communication device. Each of the above described components of the $1\text{-}1^{st}$ home appliance may be a structure component and may include hardware.

The first communication unit 411 may receive data from the management server 100 (see FIG. 1 and FIG. 2) and may transmit the received data to the main controller 412. The first communication unit 411 may have the same configuration as the first communication unit 810 (FIG. 4) and may perform the same functions as the first communication unit 810.

The main controller 412 may receive data from the first communication unit 411 and may transmit the received data to the second communication unit 413. When the data received from the first communication unit 411 is data used in the display module 414 and/or the voice information module 415, the main controller 412 may also transmit the data to the display module 414 and/or the voice information module 415. The main controller 412 may have the same configuration as the controller 820 (FIG. 4) and may perform the same functions as the controller 820.

The second communication unit 413 may transmit/receive data to/from at least one of the $1\text{-}2^{nd}$ home appliance 420, the $1\text{-}3^{rd}$ home appliance 430, and the $1\text{-}4^{th}$ home appliance 440. The second communication unit 413 may transmit/receive data via asynchronous serial communication. Asynchronous serial communication allows straightforward implementation of hardware of a corresponding home appliance. In addition, the second communication unit 413 may transmit/receive data at a rate of 4,800 bps to 4 Mbps. Preferably, the second communication unit 413 transmits/receives data at a rate of 9,600 bps. As described above, the $1\text{-}1^{st}$ home appliance 410 may be an indoor unit of an air conditioner, and the $1\text{-}4^{th}$ home appliance 440 may be an outdoor unit of the air conditioner. Considering a distance between indoor and outdoor units of an air conditioner in a typical installation environment and surroundings thereof, a communication speed within the above range can ensure reliable communication while shortening the time required for data transmission. For example, the second communication unit 413 may include a universal asynchronous receiver/transmitter (UART) and may transmit/receive data via RS485 communication. The second communication unit 413 may include a buffer to temporarily store data.

The display module 414 may visually display various types of information for user convenience. For example, the display module 414 may display at least one of information related to operation of a corresponding home appliance, information related to the condition of the home appliance, and other daily life-related information. The display module 414 may be operated under control of the main controller 412, and/or may include a separate display controller. Predetermined data may be transmitted from the management server to drive the display module 414. The display module 414 may receive the data via the main controller 412.

The voice information module 415 may provide various types of voice information for user convenience. Similar to the display module 414, the voice information module 415 may provide at least one of voice information related to operation of a corresponding home appliance, voice information related to the condition of the home appliance, and other daily life-related voice information. The voice information module 415 may be operated under the control of the main controller 412, and/or may include a separate voice controller. Predetermined data may be transmitted from the management server to drive the voice information module 415. The voice information module 415 may receive the data via the main controller 412.

The sensor unit 416 may acquire information related to operation of a corresponding home appliance. For example, when the home appliance is an air conditioner, the sensor unit 416 may detect at least one of indoor temperature, the temperature of air discharged from the air conditioner, indoor humidity, and/or the temperature and/or pressure of a circulating refrigerant. The sensor unit 416 may include at least one sensor.

The 1-$2^{nd}$ home appliance 420 may have substantially the same configuration as the 1-$1^{st}$ home appliance 410. That is, a first communication unit 421, a main controller 422, a second communication unit 423, a display module 424, a voice information module 425, and a sensor unit 426 may be substantially the same as the first communication unit 411, the main controller 412, the second communication unit 413, the display module 414, the voice information module 415, and the sensor unit 416, respectively.

The 1-$3^{rd}$ home appliance 430 may be substantially the same as the 1-$1^{st}$ home appliance except that the 1-$3^{rd}$ home appliance does not include a first communication unit as described above. That is, a main controller 432, a second communication unit 433, a display module 434, a voice information module 435, and a sensor unit 436 may be substantially the same as the main controller 412, the second communication unit 413, the display module 414, the voice information module 415, and the sensor unit 416, respectively.

A main controller 442 and a second communication unit 443 of the 1-$4^{th}$ home appliance 440 may be substantially the same as the main controller 412 and the second communication unit 413 of the 1-$1^{st}$ home appliance 410, respectively. As described above, the 1-$4^{th}$ home appliance 440 may be an outdoor unit of an air conditioner. In this example, the 1-$4^{th}$ home appliance 440 may include a compressor 444, a fan 445, and the like. The main controller 442 may control the compressor 444 and/or the fan 445 using a program contained in data received from the 1-$1^{st}$ home appliance 410. The 1-$4^{th}$ home appliance 440 may also include a sensor unit 446 that acquires information related to operation of a corresponding home appliance. When the 1-$4^{th}$ home appliance 440 is an outdoor unit of an air conditioner, the sensor unit 446 may detect at least one of the pressure or temperature of a refrigerant, outdoor temperature, and outdoor humidity. The sensor unit 446 may include at least one sensor.

Figure 6:
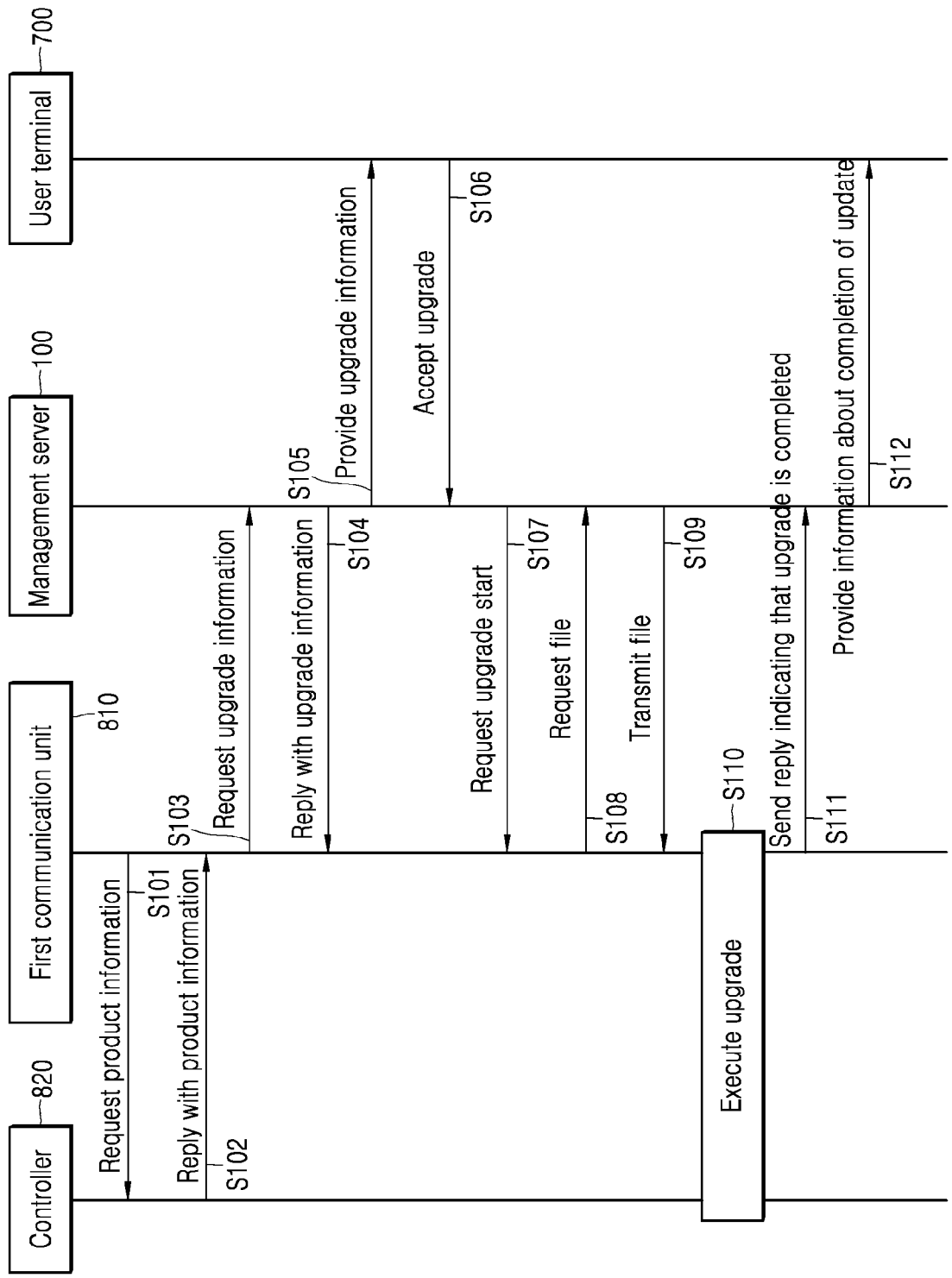
FIG. 6 to FIG. 9 are flow diagrams illustrating the overall operation of a method for upgrading home appliances according to respective embodiments of the present disclosure.

FIG. 6 is a flow diagram illustrating an overall operation of a method for upgrading home appliances according to one embodiment of the present disclosure.

The first communication unit 810 may request home appliance-related information (product information) from the controller 820 (step S101). The product information may be a home appliance identifier. The home appliance identifier may include at least one of a serial number and a model name of a corresponding home appliance. In step S101, the management server 100 may request the home appliance-related information from the first communication unit 810 and, in response thereto, the first communication unit 810 may request the home appliance-related information from the controller 820.

In response to the request for product information, the controller 820 may reply to the first communication unit 810 with the home appliance-related information (for example, the home appliance identifier) (step S102).

The first communication unit 810 may then request information about whether there are upgrades to be made to the home appliance from the management server 100 (step S103). The first communication unit 810 may transmit the home appliance-related information (for example, the home appliance identifier) to the management server 100. The first communication unit 810 may further transmit user information to the management server 100. The first communication unit 810 may transmit/receive data to/from the management server 100 through a repeater. The repeater may be the access point of FIG. 2.

The management server 100 may reply to the first communication unit 810 with upgrade information (step S104). The upgrade information may include at least one of information about whether there are upgrades to be made to the corresponding home appliance, which is identified based on the home appliance-related information, and information about the content or details of the upgrades. To this end, the management server 100 may determine whether to upgrade the home appliance. In addition, the management server 100 may determine what upgrade method to use. For example, the management server 100 may determine what upgrade method to use by identifying details of the upgrades. Examples of upgrade methods may include full upgrade, differential upgrade, and background upgrade.

Additionally, the management server 100 may also provide the upgrade information to the user terminal 700 (step S105). The management server 100 may retrieve information about a user of the home appliance from the storage unit 130 (see FIG. 3), or may receive user information from the first communication unit 810.

When the user accepts upgrade of the home appliance using the user terminal 700, information about upgrade acceptance may be transmitted from the user terminal 700 to the management server 100 (step S106).

Alternatively, the user may accept upgrade of the home appliance using an input/output unit of the home appliance, instead of using the user terminal 700.

In response to user acceptance of upgrade, the management server 100 may send an upgrade start request to the communication unit 810 (step S107). In some embodiments, the management server 100 may determine what upgrade method to use in this step. How to determine what upgrade method to use will be easily understood by referring to the description of step S104.

In response to the upgrade start request from the management server 100, the first communication unit 810 may send a file transmission request to the management server 100 (step S108).

In response to the file transmission request from the first communication unit 810, the management server 100 may transmit a file including data for upgrade of the home appliance to the first communication unit 810 (step S109). The data may include at least one of program data for a most recent version of the home appliance, delta data, and/or a set of instructions.

The first communication unit 810 and the controller 820 may update a program for the home appliance using the file received from the management server 100 (step S110).

When upgrade is completed, the first communication unit 810 may send a reply indicating completion of upgrade to the management server 100 (step S111).

In response to the reply from the first communication unit 810 that indicates completion of upgrade, the management server 100 may provide information about completion of upgrade to the user terminal (step S112).

As described above, the controller 820 of FIG. 6 may be the main controller 412 of FIG. 5 and the first communication unit 810 of FIG. 6 may be the first communication unit 411 of FIG. 5.

Figure 7:
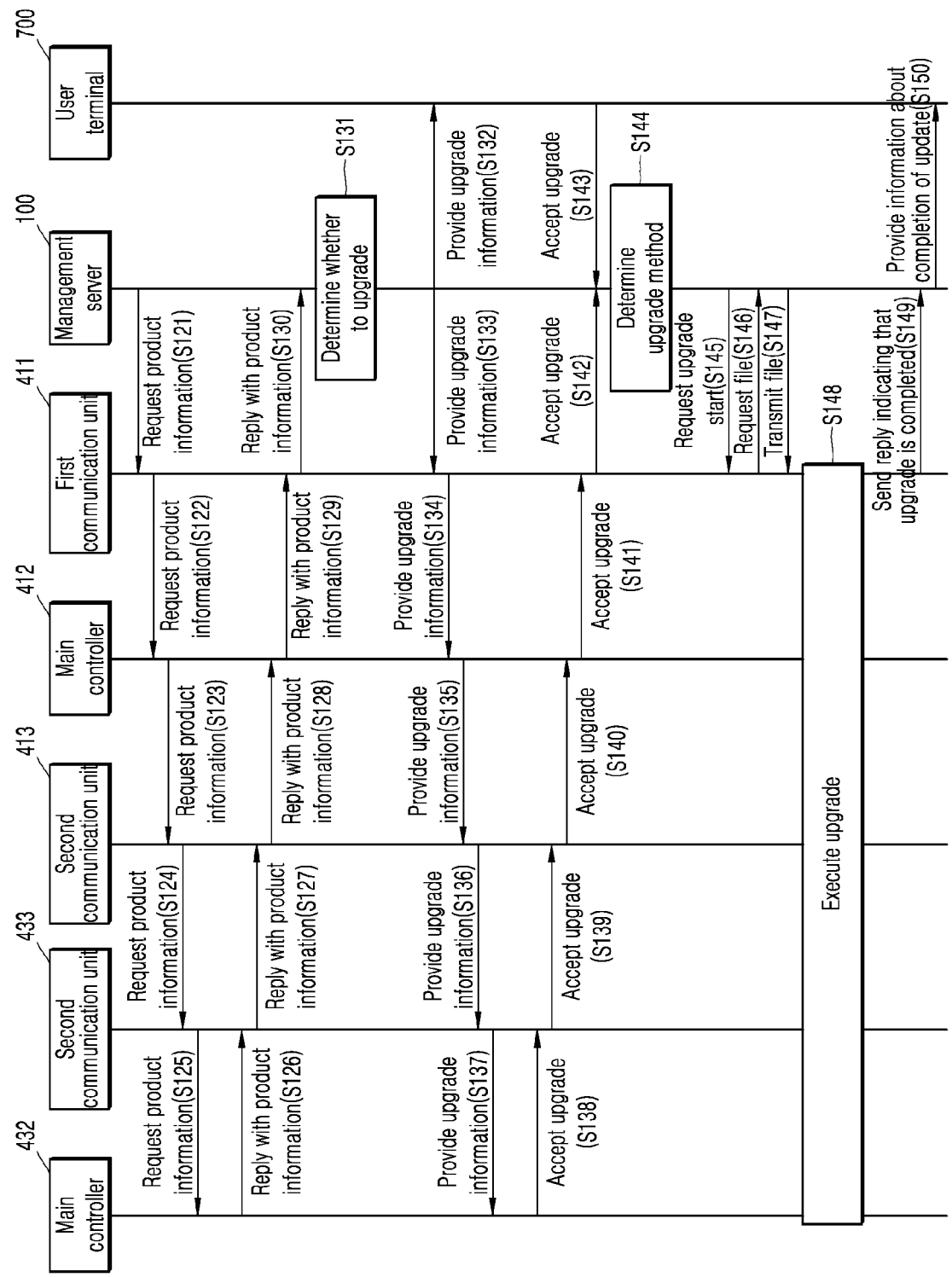

FIG. 7 is a flow diagram illustrating the overall operation of a method for upgrading home appliances according to one embodiment of the present disclosure.

First, the management server 100 may request information about the 1-3$^{rd}$ home appliance 430 from the first communication unit 411 of the 1-1$^{st}$ home appliance 410 (step S121). Similar to that described in FIG. 6, the information about the 1-3$^{rd}$ home appliance 430 may be an identifier of the 1-3$^{rd}$ home appliance 430. The identifier of the 1-3$^{rd}$ home appliance 430 may include at least one of a serial number and model name of the 1-3$^{rd}$ home appliance 430.

The request for product information transmitted from the management server 100 to the first communication unit 411 may be delivered to the main controller 432 of the 1-3$^{rd}$ home appliance 430 through the main controller 412 of the 1-1$^{st}$ home appliance 410, the second communication unit 413 of the 1-1$^{st}$ home appliance 410, and the second communication unit 433 of the 1-3$^{rd}$ home appliance 430 (steps S122 to S125).

In response to the request for product information, the main controller 432 of the 1-3$^{rd}$ home appliance 430 may reply to the management server 100 with the information about the 1-3$^{rd}$ home appliance (for example, the identifier of the 1-3$^{rd}$ home appliance) through the second communication unit 433 of the 1-3$^{rd}$ home appliance 430, the second communication unit 413 of the 1-1$^{st}$ home appliance 410, the main controller 412 of the 1-1$^{st}$ home appliance 410, and the first communication unit 411 of the 1-1$^{st}$ home appliance 410 (steps S126 to S130).

Then, the management server 100 may reply with the upgrade information described above. More specifically, the management server 100 may provide the upgrade information to the main controller 432 of the 1-3$^{rd}$ home appliance 430 through the first communication unit 411 of the 1-1$^{st}$ home appliance 410, the main controller 412 of the 1-1$^{st}$ home appliance 410, the second communication unit 413 of the 1-1$^{st}$ home appliance 410, and the second communication unit 433 of the 1-3$^{rd}$ home appliance 430 (steps S133 to S137). In addition, the management server 100 may also provide the upgrade information to the user terminal 700 (step S132). The management server 100 may retrieve information about a user of a corresponding home appliance from the storage unit 130 (see FIG. 3), or may receive user information from the first communication unit 411.

Then, the management server 100 may receive an acceptance of upgrade. More specifically, the management server 100 may receive the acceptance of upgrade from the main controller 432 of the 1-3$^{rd}$ home appliance 430 through the second communication unit 433 of the 1-3$^{rd}$ home appliance 430, the second communication unit 413 of the 1-1$^{st}$ home appliance 410, the main controller 412 of the 1-1$^{st}$ home appliance 410, and the first communication unit 411 of the 1-1$^{st}$ home appliance 410. For example, the 1-3$^{rd}$ home appliance 430 may display the upgrade information on a display unit (for example, a display panel or LED) and then may send the acceptance of upgrade to the management server 100 in response to user input received through an input unit (a touchpad, switch, or remote controller). Alternatively, when the user accepts upgrade using the user terminal 700, information about upgrade acceptance may be transmitted from the user terminal 700 to the management server 100 (step S143).

Then, the management server 100 may determine what upgrade method to use (step S144). For example, the management server 100 may determine what upgrade method to use by identifying the details of upgrades to be made. Examples of upgrade methods may include full upgrade, differential upgrade, and background upgrade.

Then, in response to user acceptance of upgrade, the management server 100 may send an upgrade start request to the first communication unit 411 (step S145).

In response to the upgrade start request from the management server 100, the first communication unit 411 may send a file transmission request to the management server 100 (step S146).

In response to the file transmission request from the communication unit 810, the management server 100 may transmit a file including data for upgrade of the corresponding home appliance to the first communication unit 411 (step S147). Here, the upgrade data may include program data for a most recent version of the home appliance, delta data, and/or a set of instructions.

At least one of the first communication unit 411 of the 1-1$^{st}$ home appliance 410, the main controller 412 of the 1-1$^{st}$ home appliance 410, and the second communication unit 413 of the 1-1$^{st}$ home appliance 410, the second communication unit 433 of the 1-3$^{rd}$ home appliance 430, and the main controller 432 of the 1-3$^{rd}$ home appliance 430 may upgrade the home appliance using the received file (step S148). A process of upgrading the home appliance may include at least one of transmitting data and replacing data stored in the home appliance with data in the received file.

When upgrade is completed, the first communication unit 411 may send a reply indicating completion of upgrade to the management server 100 (step S149).

In response to the reply from the first communication unit 411 that indicates completion of upgrade, the management server 100 may provide information about completion of upgrade to the user terminal 700 (step S150).

Figure 8:
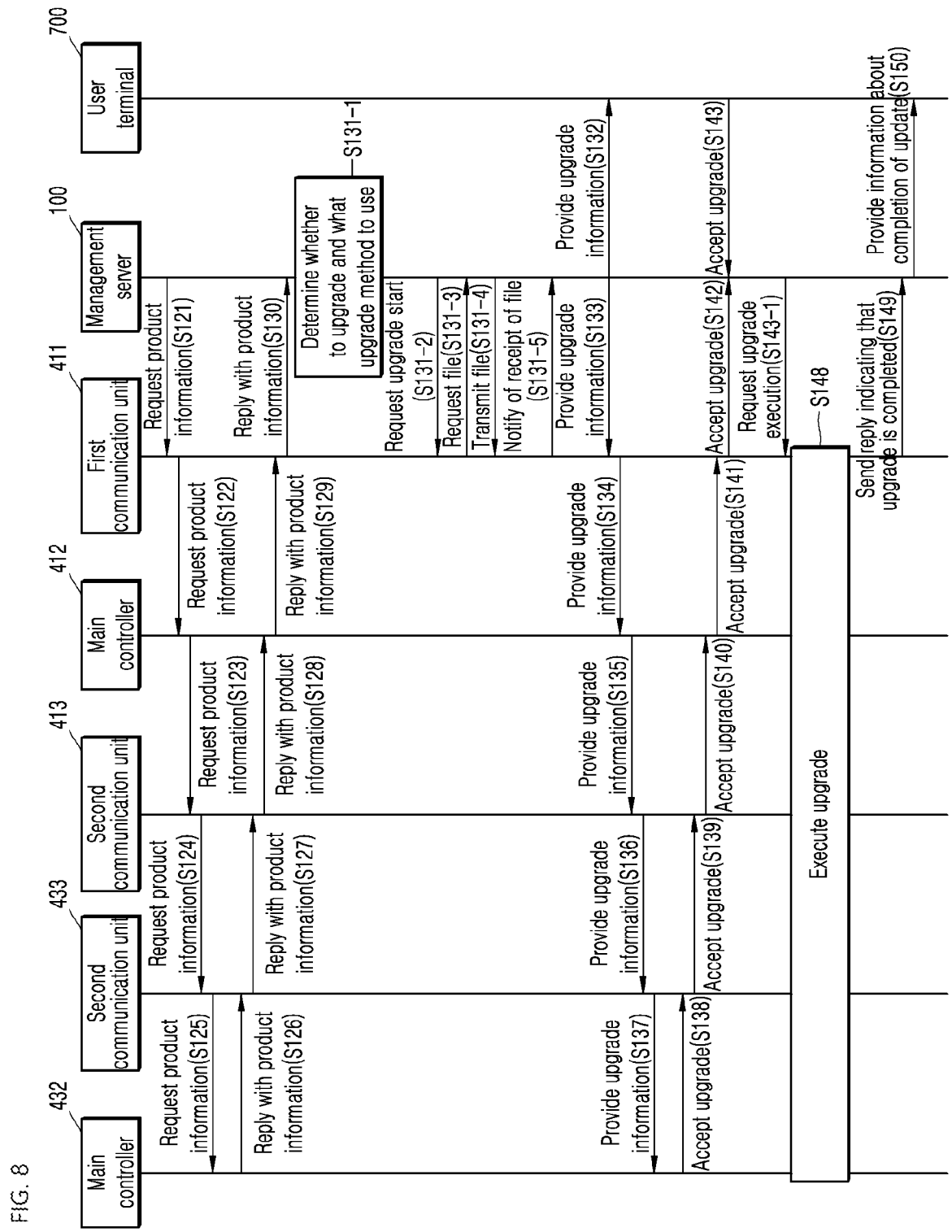

FIG. 8 is a flow diagram illustrating the overall operation of a method for upgrading home appliances according to one embodiment of the present disclosure.

In FIG. 8, processes indicated by the same reference numerals as in FIG. 7 are the same as those described in FIG. 7. That is, the embodiment shown in FIG. 8 may be substantially the same as that described in FIG. 7 except that data for upgrade of a corresponding home appliance is transmitted to the 1-3$^{rd}$ home appliance 430 before receipt of an acceptance of upgrade from a user.

More specifically, when the management server 100 receives home appliance-related information from the 1-3$^{rd}$ home appliance 430, the management server 100 may determine whether to upgrade a corresponding home appliance and what upgrade method to use (step S131-1). Here, step S131-1 may be the same as step S131 and step S144 of FIG. 7.

Then, the management server 100 may send an upgrade start request to the first communication unit 411 (step S131-2). Then, in response to the upgrade start request from the management server 100, the first communication unit 411 may send a file transmission request to the management server 100 (step S131-3). Then, in response to the file transmission request from the first communication unit 411, the management server 100 may transmit a file including data for upgrade of the home appliance to the first communication unit 411 (step S131-4). Here, steps S131-2 to S131-4 may be the same as steps S145 to S147 of FIG. 7, respectively.

Then, in response to user acceptance of upgrade, the management server 100 may send an upgrade execution request to the first communication unit 411. Then, in response to the upgrade execution request from the management server 100, at least one of the first communication unit 411 of the 1-1$^{st}$ home appliance 410, the main controller 412 of the 1-1$^{st}$ home appliance 410, the second communication unit 413 of the 1-1$^{st}$ home appliance 410, the second communication unit 433 of the 1-3$^{rd}$ home appliance 430, and the main controller 432 of the 1-3$^{rd}$ home appliance 430 may upgrade the home appliance using the received file (step S148).

Figure 9:
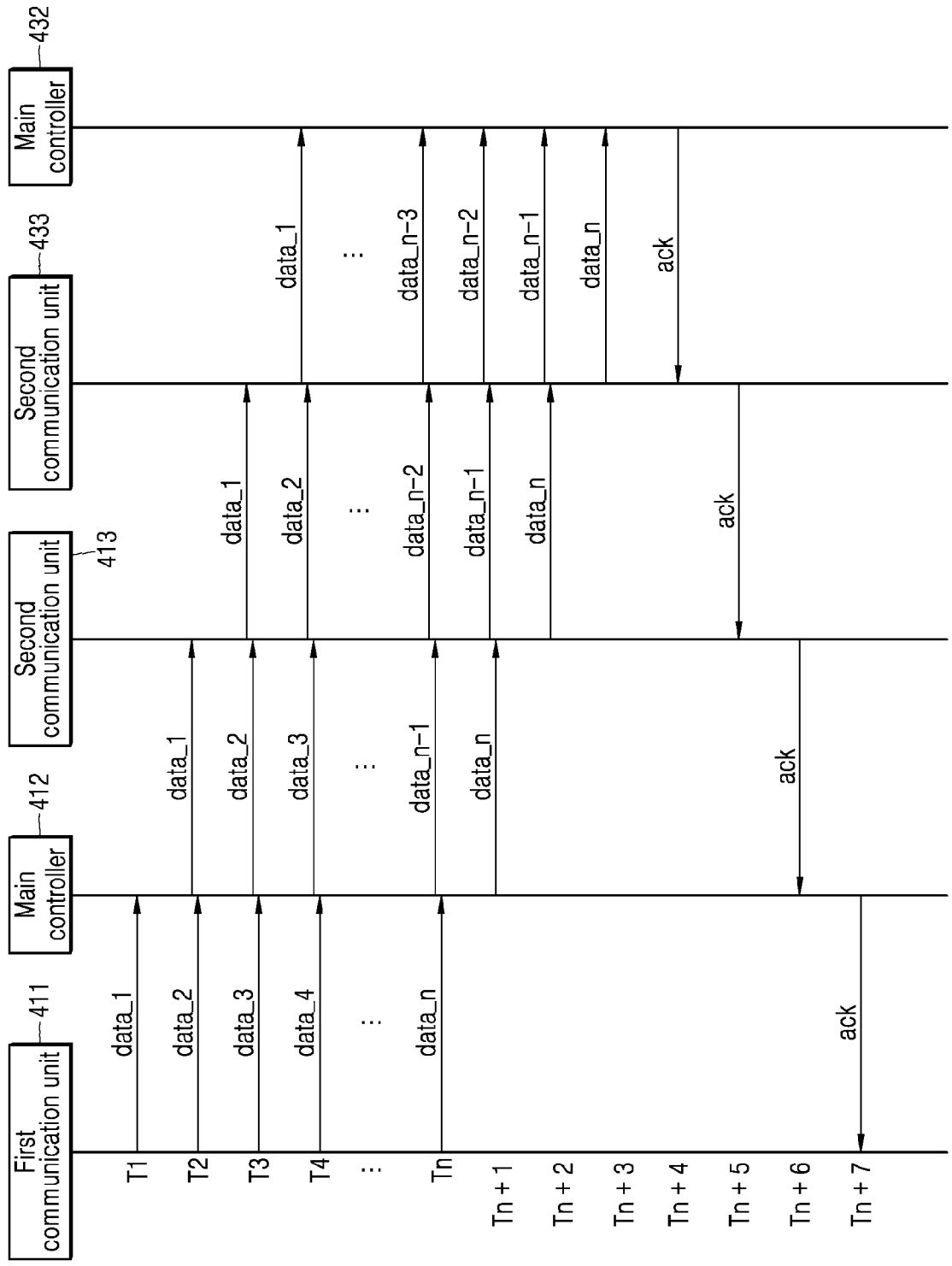

FIG. 9 is a flow diagram of a process of transmitting program data in a method of upgrading electronic devices according to one embodiment of the present disclosure, illustrating data transmission from the 1-1$^{st}$ home appliance 410 to the 1-3$^{rd}$ home appliance 430.

Referring to FIG. 5 and FIG. 9, the process of transmitting program data in the method of upgrading electronic devices according to this embodiment will be described.

In a first timeslot T1, the first communication unit 411 may transmit a first data segment (data_1) of a unit size to the main controller 412. Herein, the unit size may be 256 bytes.

In a second timeslot T2, the first communication unit 411 may transmit a second data segment (data_2) of the unit size to the main controller 412 and the main controller 412 may transmit the first data segment (data_1) to the second communication unit 413. Here, the main controller 412 may receive the second data segment (data_2) from the first communication unit 411 after transmitting the first data segment (data_1) to the second communication unit 413. If necessary, the main controller 412 may store at least a portion of the first data segment (data_1) and the second data segment (data_2) in a storage unit thereof.

In a third timeslot T3, the first communication unit 411 may transmit a third data segment (data_3) of the unit size to the main controller 412, the main controller 412 may transmit the second data segment (data_2) to the second communication unit 413, and the second communication unit 413 may transmit the first data segment (data_1) to the second communication unit 433. Here, the main controller 412 may receive the third data segment (data_3) from the first communication unit 411 after transmitting the second data segment (data_2) to the second communication unit 413. In addition, the second communication unit 413 may receive the second data segment (data_2) from the main controller 412 after transmitting the first data segment (data_1) to the second communication unit 433. If necessary, the main controller 412 may store at least a portion of the second data segment (data_2) and the third data segment (data_3) in the storage unit thereof and the second communication unit 413 may store at least a portion of the first data segment (data_1) and the second data segment (data_2) in a buffer thereof.

In a fourth timeslot T4, the first communication unit 411 may transmit a fourth data segment (data_4) of the unit size to the main controller 412, the main controller 412 may transmit the third data segment (data_3) to the second communication unit 413, the second communication unit 413 may transmit the second data segment (data_2) to the second communication unit 433, and the second communication unit 433 may transmit the first data segment (data_1) to the main controller 432. Here, the main controller 412 may receive the fourth data segment (data_4) from the first communication unit 411 after transmitting the third data segment (data_3) to the second communication unit 413. In addition, the second communication unit 413 may receive the third data segment (data_3) from the main controller 412 after transmitting the second data segment (data_2) to the second communication unit 433. In addition, the second communication unit 433 may receive the second data segment (data_2) from the second communication unit 413 after transmitting the first data segment (data_1) to the main controller 432. If necessary, the main controller 412 may store at least a portion of the third data segment (data_3) and the fourth data segment (data_4) in the storage unit thereof, the second communication unit 413 may store at least a portion of the second data segment (data_2) and the third data segment (data_3) in the buffer thereof, and the second communication unit 433 may store at least a portion of the first data segment (data_1) and the second data segment (data_2) in a buffer thereof.

That is, in an nth timeslot Tn, the first communication unit 411 may transmit an nth data segment (data_n) of the unit size to the main controller 412, the main controller 412 may transmit an n-1$^{th}$ data segment (data_n-1) to the second communication unit 413, the second communication unit 413 may transmit an n-2$^{th}$ data segment (data_n-2) to the second communication unit 433, and the second communication unit 433 may transmit an n-3$^{th}$ data segment (data_n-3) to the main controller 432. Here, the main controller 412 may receive the nth data segment (data_n) from the first communication unit 411 after transmitting the n-1$^{th}$ data segment (data_n-1) to the second communication unit 413. In addition, the second communication unit 413 may receive the n-1$^{th}$ data segment (data_n-1) from the main controller 412 after transmitting the n-2$^{th}$ data segment (data_n-2) to the second communication unit 433. In addition, the second communication unit 433 may receive the n-2$^{th}$ data segment (data_n-2) from the second communication unit 413 after transmitting the n-3$^{th}$ data segment (data_n-3) to the main controller 432. If necessary, the main controller 412 may store at least a portion of the n-1$^{th}$ data segment (data_n-1) and the nth data segment (data_n) in the storage unit thereof, the second communication unit 413 may store at least a portion of the n-2$^{th}$ data segment (data_n-2) and the n-1$^{th}$ data segment (data_n-1) in the buffer thereof, and the second communication unit 433 may store at least a portion of the n-3$^{th}$ data segment (data_n-3) and the n-2$^{th}$ data segment (data_n-2) in the buffer thereof.

Here, "n" may be the number of times a data-transmitting home appliance (that is, the 1-1$^{st}$ home appliance 410 of FIG. 7) transmits a data segment before a data-receiving home appliance (that is, the 1-3$^{rd}$ home appliance 430 of FIG. 7) transmits a receipt acknowledgment signal (ack). In order words, "n" may be the number of data segments that the data-transmitting home appliance transmits before receiving the receipt acknowledgment signal (ack).

In an n+1$^{th}$ timeslot (Tn+1), the main controller 412 may transmit the nth data segment (data_n) to the second communication unit 413, the second communication unit 413 may transmit the n−1$^{th}$ data segment (data_n−1) to the second communication unit 433, and the second communication unit 433 may transmit the n−2$^{th}$ data segment (data_n−2) to the main controller 432. Here, the second communication unit 413 may receive the nth data segment (data_n) from the main controller 412 after transmitting the n−1$^{th}$ data segment (data_n−1) to the second communication unit 433. In addition, the second communication unit 433 may receive the n−1$^{th}$ data segment (data_n−1) from the second communication unit 413 after transmitting the n−2$^{th}$ data segment (data_n−2) to the main controller 432. The second communication unit 413 may store at least a portion of the n−1$^{th}$ data segment (data_n−1) and the nth data segment (data_n) in the buffer thereof and the second communication unit 433 may store at least a portion of the n−2$^{th}$ data segment (data_n−2) and the n−1$^{th}$ data segment (data_n−1) in the buffer thereof.

In an n+2$^{th}$ timeslot (Tn+2), the second communication unit 413 may transmit the nth data segment (data_n) to the second communication unit 433 and the second communication unit 433 may transmit the n−1$^{th}$ data segment (data_n−1) to the main controller 432. Here, the second communication unit 433 may receive the nth data segment (data_n) from the second communication unit 413 after transmitting the n−1$^{th}$ data segment (data_n−1) to the main controller 432. The second communication unit 433 may store at least a portion of the n−1$^{th}$ data segment (data_n−1) and the nth data segment (data_n) in the buffer thereof.

In an n+3$^{th}$ timeslot (Tn+3), the second communication unit 433 may transmit the nth data segment (data_n) to the main controller 432.

In an n+4$^{th}$ timeslot (Tn+4), the main controller 432 may transmit the receipt acknowledgment signal (ack) to the second communication unit 433. In an n+5$^{th}$ timeslot (Tn+5), the second communication unit 433 may transmit the receipt acknowledgment signal (ack) to the second communication unit 413. In an n+6$^{th}$ timeslot (Tn+6), the second communication unit 413 may transmit the receipt acknowledgment signal (ack) to the main controller 412. In an n+7$^{th}$ timeslot (Tn+7), the main controller 412 may transmit the receipt acknowledgment signal (ack) to the first communication unit 411.

Although not shown, the operation shown in FIG. 9 may be repeated until the entirety of the data is transmitted. If abnormal data transmission is detected after receipt of the receipt acknowledgment signal (ack), corresponding data may be retransmitted.

Table 1 shows the number of data segments that a specific communication unit (for example, the first communication unit 412 of FIG. 5 and FIG. 9) receiving data from the management server 100 through connection to an external network transmits before receiving a receipt acknowledgment signal (ack) from the last data-receiving unit (for example, the main controller 432 of the 1-3$^{rd}$ home appliance 430 of FIG. 5 and FIG. 9) and average transmission time (T_ave) (unit: seconds), that is, average time required to complete transmission of the entirety of the data. In Table 1, "T_ideal" is time (unit: seconds) required to complete transmission of the entirety of the data under an ideal condition without errors and "ratio" is a ratio of average transmission time when n is 2, 4, 8, or 16 to average transmission time when n is 1. In addition, Table 1 is experimental data obtained under conditions of: communication speed between the first communication unit 411 and the main controller 412:38.4 kbps; and communication speed between the main controller 412 and the second communication unit 413, between the second communication unit 413 and the second communication unit 433, and between the second communication unit 433 and the main controller 432:9.6 kbps.

TABLE 1

| n | 1 | 2 | 4 | 8 | 16 |
|---|---|---|---|---|---|
| T-ave (sec) | 2416.69 | 1454.04 | 1074.58 | 1336.61 | 5756.20 |
| T-ideal (sec) | 793.81 | 415.47 | 226.30 | 131.41 | 84.41 |
| Ratio (%) | 100 | 59 | 44 | 54 | 234 |

From Table 1, it can be seen that, when n is 2 to 8, preferably 4, faster data transmission is achieved.

Data transmission from the 1-1$^{st}$ home appliance 410 to the 1-2$^{nd}$ home appliance 420 and/or the 1-4$^{th}$ home appliance 430 may performed in substantially the same manner as described in FIG. 7.

Figure 10:
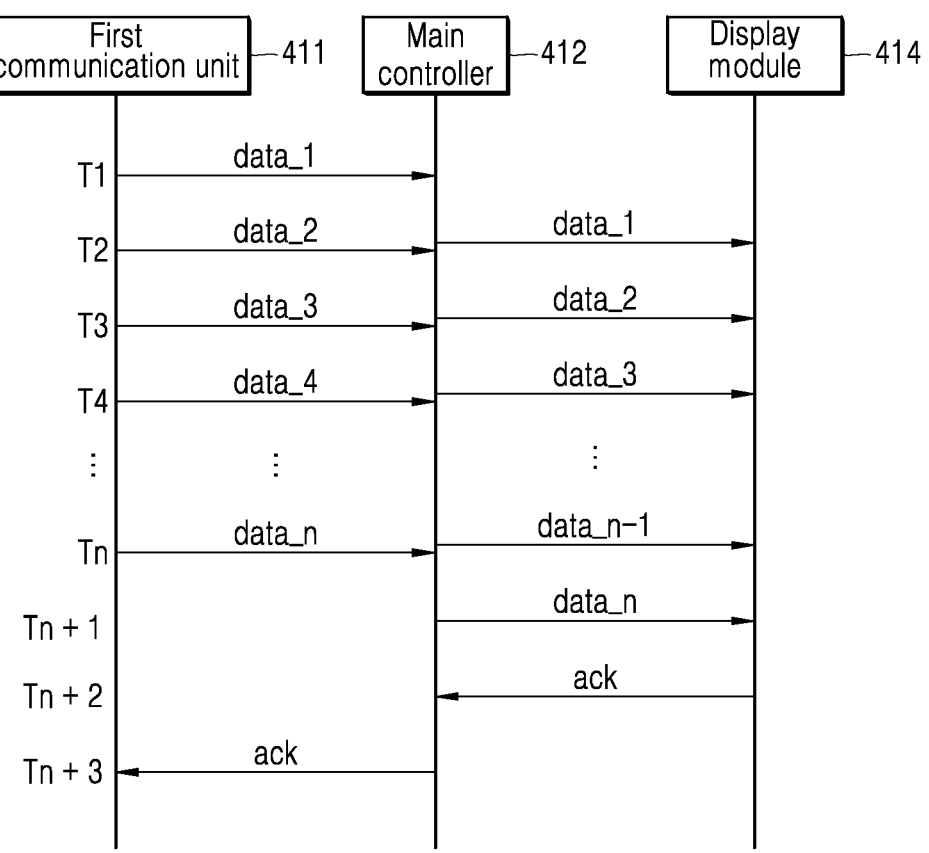

FIG. 10 is a flow diagram of a process of transmitting program data in a method of upgrading electronic devices according to one embodiment of the present disclosure, illustrating data transmission inside the 1-1$^{st}$ home appliance 410. More specifically, FIG. 10 shows the case in which data that the first communication unit 411 receives from the management server is data to drive the display module 414 and thus the data is transmitted to the display module 414 through the main controller 412.

The data transmission process shown in FIG. 10 will be easily understood by referring to the description of FIG. 7.

To put if briefly, in a first timeslot T1, the first communication unit 411 may transmit a first data segment (data_1) of the unit size to the main controller 412. In a second timeslot T2, the first communication unit 411 may transmit a second data segment (data_2) of the unit size to the main controller 412 and the main controller 412 may transmit the first data segment (data_1) to the display module 415. In an nth timeslot Tn, the first communication unit 411 may transmit an nth data segment (data_n) of the unit size to the main controller 412 and the main controller 412 may transmit an n−1$^{th}$ data segment (data_n−1) to the display module 415. In an n+1$^{th}$ timeslot (Tn+1), the main controller 412 may transmit the nth data segment (data_n) to the display module 415. In an n+2$^{th}$ timeslot (Tn+2), the display module 415 may transmit a receipt acknowledgment signal (ack) to the main controller 412. In an n+3$^{th}$ timeslot (Tn+3), the main controller 412 may transmit the receipt acknowledgment signal (ack) to the first communication unit 411.

Regarding the embodiment of FIG. 10, Table 2 shows the number of data segments that a specific communication unit (for example, the first communication unit 412 of FIG. 5 and FIG. 10) receiving data from the management server 100 through connection to an external network transmits before receiving a receipt acknowledgment signal (ack) from the last data-receiving unit (for example, the display module 414 of FIG. 5 and FIG. 10) and average transmission time (T_ave) (unit: seconds), that is, average time required to complete transmission of the entirety of the data. In Table 2, "T_ideal" is time (unit: seconds) required to complete transmission of the entirety of the data under an ideal condition without errors and "ratio" is a ratio of average transmission time when n is 32, 64, 96, or 128 to average transmission time when n is 1. In addition, Table 2 is experimental data obtained under conditions of: communication speed between the first communication unit 411 and the main controller 412:38.4 kbps; and communication between the main controller 412 and the display module 414:38.4 kbps.

TABLE 2

| N | 1 | 32 | 64 | 96 | 128 |
|---|---|---|---|---|---|
| T-ave (sec) | 57.77 | 27.09 | 28.94 | 31.62 | 34.24 |
| T-ideal (sec) | 57.33 | 24.23 | 23.69 | 23.69 | 23.43 |
| Ratio (%) | 100 | 46.87 | 50.09 | 54.74 | 59.27 |

From Table 1, it can be seen that, when n is 32 to 128, preferably 32, faster data transmission is achieved.

Data transmission inside each of the 1-$2^{th}$ household appliance 420, the 1-$3^{rd}$ household appliance 430, the 1-$4^{th}$ household appliance 440, the second household appliance 500, and the third household appliances 600 may be performed in substantially the same manner as described in FIG. 8.

Embodiments of the present disclosure provide an apparatus and method for upgrading the function of an electronic device more conveniently.

Embodiments of the present disclosure provide an apparatus and method capable of reducing the time required to upgrade an electronic device.

The above and other objects and advantages of the present disclosure will become apparent from the detailed description of the following embodiments in conjunction with the accompanying drawings. In addition, it will be readily understood that the objects and advantages of the present disclosure can be realized by features set forth in the appended claims or combinations thereof.

An electronic device and a method according to embodiments of the present disclosure provide a process of transmitting program data for controlling operations of the electronic device, in which a receipt acknowledgment signal is transmitted after transmission of the program data is performed a predetermined number of times.

An electronic device and a method according to embodiments of the present disclosure provide a process of transmitting program data for controlling operations of the electronic device, in which first data and second data are simultaneously transmitted in different sections.

In accordance with one aspect of the present disclosure, there is provided an electronic device including: a first communication unit receiving data for upgrade from outside the electronic device; and a main controller receiving the data from the first communication unit to retransmit the data or to perform a predetermined function using the data, wherein the first communication unit divides the data into multiple data segments and transmits n (n being a natural number greater than or equal to 2) data segments to the main controller before the first communication unit receives a receipt acknowledgment signal from the main controller.

In one embodiment, the first communication unit may include a Wi-Fi communication module.

In one embodiment, the electronic device may further include: a second communication unit receiving the data segments from the main controller, transmitting the data segments to an exterior, receiving the receipt acknowledgment signal from the exterior, and transmitting the receipt acknowledgment signal to the main controller.

In one embodiment, in a first timeslot, the first communication unit transmits a first data segment to the main controller; in a second timeslot, the first communication unit transmits a second data segment to the main controller and the main controller transmits the first data segment to the second communication unit; and, in a third timeslot, the first communication unit transmits a third data segment to the main controller, the main controller transmits the second data segment to the second communication unit, and the second communication unit transmits the first data segment to the exterior.

In one embodiment, the second communication unit may include an asynchronous serial communication module.

In one embodiment, n may be a natural number of 2 to 8.

In one embodiment, a rate of data transmission between the second communication unit and the main controller may range from 4,800 bps to 4 Mbps.

In one embodiment, the electronic device may further include: a functional module receiving the data segments from the main controller and transmitting the receipt acknowledgment signal to the main controller. Here, n is a natural number of 32 to 128.

In accordance with another aspect of the present invention, there is provided a method for upgrading an electronic device including a first communication unit receiving data for upgrade from outside the electronic device and a main controller receiving the data from the first communication unit, the method including: dividing, by the first communication unit, the data into multiple data segments; transmitting, by the first communication unit, n (n being a natural number greater than or equal to 2) data segments to the main controller; and transmitting, by the main controller, a receipt acknowledgment signal to the first communication unit after transmission of the n data segments is completed.

In one embodiment, the step of transmitting n data segments may include transmitting, by the main controller, the n data segments to a second communication unit different from the first communication unit.

In one embodiment, the step of transmitting a receipt acknowledgment signal may include transmitting, by the second communication unit, the receipt acknowledgment signal to the main controller.

In one embodiment, the step of transmitting n data segments may include: transmitting, by the first communication unit, a first data segment to the main controller in a first timeslot; transmitting, by the first communication unit, a second data segment to the main controller and transmitting, by the main controller, the first data segment to a second communication unit different from the first communication unit in a second timeslot; and transmitting, by the first communication unit, a third data segment to the main controller, transmitting, by the main controller, the second data segment to the second communication unit, and transmitting, by the second communication unit, the first data segment to an exterior in a third timeslot.

In one embodiment, the step of transmitting a receipt acknowledgment signal may include: transmitting, by the second communication unit, the receipt acknowledgment signal to the main controller; and transmitting, by the main controller, the receipt acknowledgment signal to the first communication unit.

In one embodiment, the first communication unit may include a Wi-Fi module and the second communication unit may include an asynchronous serial communication module.

In one embodiment, the electronic device may further include a second communication unit receiving the data segments from the main controller, transmitting the data segments to an exterior, receiving the receipt acknowledgment signal from the exterior, and transmitting the receipt acknowledgment signal to the main controller, wherein n is a natural number of 2 to 8.

In one embodiment, the step of transmitting n data segments may include transmitting, by the main controller, the n data segments to a functional module.

In one embodiment, the step of transmitting a receipt acknowledgment signal may include transmitting, by the functional module, the receipt acknowledgment signal to the main controller.

The electronic device and the method according to embodiments of the present disclosure can ensure easy upgrade of electronic devices.

In addition, the electronic device and the method according to embodiments of the present disclosure can ensure reduction in amount of time required to upgrade electronic devices.

The above and other effects of the present disclosure will become apparent from the following detailed description of the present disclosure.

Although some exemplary embodiments have been described herein, it should be understood by those skilled in the art that these embodiments are given by way of example only, and that various modifications, variations, and alterations can be made without departing from the spirit and scope of the present disclosure. In addition, although advantageous effects provided by a certain configuration are not clearly described in description of the exemplary embodiments, it should be noted that expectable effects of the corresponding configuration should be acknowledged.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An electronic device comprising:
   a first communication device configured to receive data for upgrade;
   a controller configured to receive the data from the first communication device, and to control transmission of the data; and a second communication device configured to receive data from the controller and to transmit the data to another communication device on a different electronic device;

wherein the first communication device is configured to separate the data into a plurality of data segments and to provide n number of the data segments to the controller before the first communication device receives a receipt acknowledgment signal from the controller, wherein n is a natural number of 2 to 8, and a rate of data transmission between the second communication device and the another communication device on the different electronic device ranges from 4.800 bps to 4 Mbps depending on the n number of the data segments used.

2. The electronic device according to claim 1, wherein the first communication device includes a Wi-Fi communication module to receive data.

3. The electronic device according to claim 1, wherein the second communication device is configured to receive the data segments from the controller, to transmit the data segments to the different electronic device, to receive the receipt acknowledgment signal from the different electronic device, and to provide the receipt acknowledgment signal to the controller.

4. The electronic device according to claim 3, wherein:
in a first timeslot, the first communication device is to provide a first data segment, of the plurality of data segments, to the controller;
in a second timeslot, the first communication device is to provide a second data segment, of the plurality of data segments, to the controller, and the controller is to provide the first data segment to the second communication device; and
in a third timeslot, the first communication device is to provide a third data segment, of the plurality of data segments, to the controller, the controller is to provide the second data segment to the second communication device, and the second communication device is to provide the first data segment to the different electronic device.

5. The electronic device according to claim 1, wherein the second communication device is to transmit or receive data using asynchronous serial communication.

6. The electronic device according to claim 1, comprising:
a functional module configured to receive the data segments from the controller and to provide the receipt acknowledgment signal to the controller.

7. The electronic device according to claim 1, wherein the second communication device is to communicate via a RS485 communication line with the another communication device on the different electronic device.

8. A method for upgrading an electronic device that includes a first communication device for receiving data for upgrade and a controller for receiving the data from the first communication device, the method comprising:
separating, by the first communication device, the data into a plurality of data segments;
providing, by the first communication device, n number of the data segments to the controller;
providing, by the controller, at least one of the n number of the data segments to a second communication device different from the first communication device;
providing, by the second communication device, at least one of the n number of the data segments to another communication device at a different electronic device; and
providing, by the controller, a receipt acknowledgment signal to the first communication device after the providing of the n number of the data segments is completed,
wherein n is a natural number of 2 to 8, and a rate of data transmission between the second communication device and the different electronic device ranges from 4.800 bps to 4 Mbps depending on the n number of the data segments used.

9. The method according to claim 8, comprising:
providing, by the second communication device, the receipt acknowledgment signal to the controller.

10. The method according to claim 8, wherein the providing the n number of the data segments includes:
providing, by the first communication device, a first data segment to the controller in a first timeslot;
providing, by the first communication device, a second data segment to the controller and providing, by the controller, the first data segment to the second communication device in a second timeslot; and
providing, by the first communication device, a third data segment to the controller, providing, by the controller, the second data segment to the second communication device, and providing, by the second communication device, the first data segment to the different electronic device in a third timeslot.

11. The method according to claim 10, wherein the providing the receipt acknowledgment signal includes:
providing, by the second communication device, the receipt acknowledgment signal to the controller; and
providing, by the controller, the receipt acknowledgment signal to the first communication device.

12. The method according to claim 8, wherein the first communication device includes a Wi-Fi module, and the second communication device includes an asynchronous serial communication module.

13. The method according to claim 8, wherein the second communication device receiving the data segments from the controller, providing the data segments to the different electronic device, receiving the receipt acknowledgment signal from the different electronic device, and providing the receipt acknowledgment signal to the controller.

14. The method according to claim 8, wherein the second communication device is to communicate via a RS485 communication line with the another communication device on the different electronic device.

15. An electronic device comprising:
a first communication device configured to receive data for upgrade, to separate the received data into a plurality of data segments, and to provide n number of the data segments before receiving a receipt acknowledgment signal;
a controller configured to receive the n number of the data segments from the first communication device, to control transmission of the data, and to provide the receipt acknowledgment signal to the first communication device; and
a second communication device configured to receive the data segments from the controller, to transmit the data segments to a different electronic device, to receive the receipt acknowledgment signal from the different electronic device, and to provide the receipt acknowledgment signal to the controller, and wherein n is a natural number of 2 to 8, and a rate of data transmission between the second communication device and the different electronic device ranges from 4,800 bps to 4 Mbps depending on the n number of the data segments used.

16. The electronic device according to claim 15, wherein:
in a first timeslot, the first communication device is to provide a first data segment, of the plurality of data segments, to the controller;
in a second timeslot, the first communication device is to provide a second data segment, of the plurality of data segments, to the controller, and the controller is to provide the first data segment to the second communication device; and
in a third timeslot, the first communication device is to provide a third data segment, of the plurality of data segments, to the controller, the controller is to provide the second data segment to the second communication device, and the second communication device is to provide the first data segment to the different electronic device.

17. The electronic device according to claim 15, wherein the first communication device includes a Wi-Fi communication module to receive data.

18. The electronic device according to claim 15, wherein the second communication device is to transmit or receive data using asynchronous serial communication.

19. The electronic device according to claim 15, wherein the second communication device is to communicate via a RS485 communication line with the different electronic device.

* * * * *